May 10, 1927.

W. S. H. HAMILTON

MOTOR CONTROL SYSTEM

Filed May 16, 1925

| STEPS | | CONTACTOR | | | | | | | | | | | CAM OPERATED CONTACTS | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 16 | 17 | 10 | 11 | 12 | 13 | 14 | 15 |
| SERIES | 1 | ● | | | | | | | | | □ | □ | ○ | ○ | | | ○ | |
| | 2 | ● | ● | | | | | | | | □ | □ | ○ | ○ | | | ○ | |
| | 3 | ● | ● | | | | ● | | | | □ | □ | ○ | ○ | | | ○ | |
| | 4 | ● | ● | ● | | | ● | | | | □ | □ | ○ | ○ | | | ○ | |
| | 5 | ● | ● | ● | | | ● | ● | | | □ | □ | ○ | ○ | | | ○ | |
| | 6 | ● | ● | ● | | ● | ● | | | | □ | □ | ○ | ○ | | | ○ | |
| | 7 | ● | ● | | ● | ● | | ● | ● | ● | □ | □ | ○ | ○ | | | ○ | |
| SWITCH TRANSFER | T-1 | ● | | | | ● | | | | ● | □ | □ | ○ | ○ | | | ○ | |
| | T-2 | ● | | | | ● | | | | ● | □ | □ | | ○ | | | ○ | |
| | T-3 | ● | | | | ● | | | | ● | □ | □ | | ○ | ○ | | ○ | |
| | T-4 | ● | | | | ● | | | | ● | □ | □ | | ○ | | | | |
| | T-5 | ● | | | | ● | | | | ● | □ | □ | | | ○ | ○ | | ○ |
| PARALLEL | 8 | ● | | | | ● | | | | ● | □ | □ | | | ○ | ○ | | ○ |
| | 9 | ● | ● | | | ● | | | | ● | □ | □ | | | ○ | ○ | | ○ |
| | 10 | ● | ● | | | ● | ● | | | ● | □ | □ | | | ○ | ○ | | ○ |
| | 11 | ● | ● | ● | | ● | ● | ● | | ● | □ | □ | | | ○ | ○ | | ○ |
| | 12 | ● | ● | ● | ● | ● | ● | ● | ● | ● | □ | □ | | | ○ | ○ | | ○ |

Inventor:
William S. H. Hamilton,
by *Alexander S. Lano*
His Attorney.

May 10, 1927.

W. S. H. HAMILTON

1,628,402

MOTOR CONTROL SYSTEM

Filed May 16, 1925

Inventor:
William S. H. Hamilton,
by
His Attorney.

May 10, 1927.

W. S. H. HAMILTON

MOTOR CONTROL SYSTEM

Filed May 16, 1925

Inventor:
William S. H. Hamilton,
by
His Attorney.

Patented May 10, 1927.

1,628,402

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

MOTOR-CONTROL SYSTEM.

Application filed May 16, 1925. Serial No. 30,852.

This invention relates to systems of control for electric motors, and is particularly directed to systems of control for electric motors which are operated as load driven generators to brake the load.

The main object of the present invention is to provide an improved motor control system of the above character whereby both the motoring and the braking effects are controlled in a simple and reliable manner.

More specifically, the invention provides a novel arrangement of control apparatus and circuits whereby the motors may be connected to a source of supply for motoring operation and the voltage of the motors may be brought up to and automatically maintained at a suitable value for regenerative braking operation and the braking effect may be automatically limited to a desired value.

Although not necessarily limited to such use, the present invention has particular utility in the control of the driving motors of an electric locomotive which is employed to regeneratively brake a train of cars. By means of my invention, the electric locomotive may be controlled so as to insure that the slack in the train is gradally drawn out during motoring operation and bunched during regenerative braking operation on steep grades, while provision is made for proper adjustment of the slack when braking operating is commenced directly from stand still. Where the electric locomotive is provided with series traction motors, it is the usual practice to energize the series field windings of the motors from auxiliary sources of current and thereby cause the motors to generate a voltage of greater value than the voltage of the source in order to effect regenerative braking operation. To insure that the slack in the train is held bunched during regenerative braking operation, it is necessary that the regenerative voltage of the motors always exceed the voltage of the supply source, since otherwise a motoring effect would result which might pull out the slack. However, under certain conditions, as for example, when the exchange of current between the motors and the source is limited to a relatively low value by resistors connected in circuit with the motors, the regenerated voltage of the motors may become sufficiently excessive to cause destructive arcing or even flash-over of the motors.

In accordance with my present invention, the possibility of such destructive arcing or flash-over is effectively prevented by automatically maintaining the regenerated voltage of the motors at a value which is within the safe operating limits of the motor and which at the same time is ample to insure that regenerative braking operation always occurs even with the current limiting resistors in circuit with the motor. The regenerated braking effect of the motors is automatically limited at all times to a desired value.

In carrying the invention into effect in a preferred form, the regenerated voltage of the motors is automatically maintained at a predetermined safe value through the agency of an electro-responsive device which is connected to be energized responsively to the voltage of the motors and which preferably is arranged to cooperate with automatic means responsive to the regenerated current of the motors to control the energization of the field windings of the motors from the auxiliary source of current. Preferably, the arrangement is such that the regenerated voltage of the motors is automatically maintained at the predetermined value only when the exchange of current between the motors and the source is limited by current limiting resistors connected in the regenerative braking circuit of the motors. After the current limiting resistors are removed from the braking circuit, the automatic current responsive controlling means serves to maintain the energization of the field windings of the motors at the value required for the desired regenerative braking operation.

The invention will be more readily understood from the following description of the accompanying drawings which diagrammatically illustrate an electric locomotive motor control system embodying a preferred form of the invention for the purpose of explaining the principles thereof. In the drawings.

Figure 1:
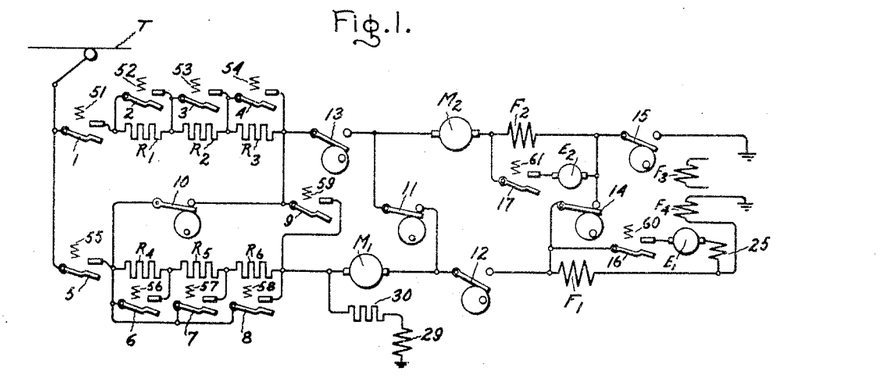
Fig. 1 is a schematic diagram of the power circuits of the traction motors of the locomotive, showing the general relation of the several current limiting resistors, controlling contactors and auxiliary sources of current employed in series and parallel motoring and regenerative braking operation of the locomotive.

Referring first to Fig. 1, it will be observed that the driving motors, $M_1$, $M_2$, having respectively series field winding $F_1$, $F_2$, are arranged to receive power from the overhead trolley T during motoring operation and to return power thereto during regenerative braking operation. The exchange of current between the motors $M_1$ and $M_2$ and the trolley T is limited during certain phases of both motoring and regenerative braking operation by the resistors $R_1$, $R_2$, $R_3$, $R_4$, $R_5$, $R_6$. In accordance with the usual practice, the motors $M_1$ and $M_2$ are arranged to be connected to the trolley T in series or in parallel relation by means of the several circuit controlling contactors 1, 5, 10, 11, 12, 13, 14, 15 for either motoring or regenerative braking operation and the contactors 2, 3, 4, 6, 7, 8, are provided for short circuiting the corresponding current limiting resistors $R_1$, $R_2$, $R_3$, $R_4$, $R_5$, $R_6$, as indicated in the drawing.

In order to effect regenerative braking operation of motors $M_1$, $M_2$, the respective field windings of the motors $F_1$, $F_2$ are arranged to be energized from auxiliary sources of current such as the exciters $E_1$, $E_2$, indicated in the drawing, when the contactors 16 and 17 are closed. As shown, the exciters $E_1$, $E_2$, are excited by common field windings comprising the separately excited shunt field winding $F_3$ and the series field winding $F_4$. Preferably both exciters are mounted upon a common shaft which is arranged to be driven by suitable power means not shown in the drawing.

It will be observed that the several circuit controlling contactors 1 to 9, and the exciter controlling contactors 16 and 17 are shown as of the electro-magnetically operated type, while the series-parallel contactors 10, 11, 12, 13, 14 and 15 are shown as of the cam-operated type. Preferably the operating cams of the several series-parallel contactors are mounted upon a common cam shaft which is arranged to be operated by a suitable electrically controlled pneumatic operating engine not shown in the drawing, but which may be of the type illustrated and described in Patent No. 1,267,817, issued upon the joint application of R. Stearns and myself.

Figure 2:
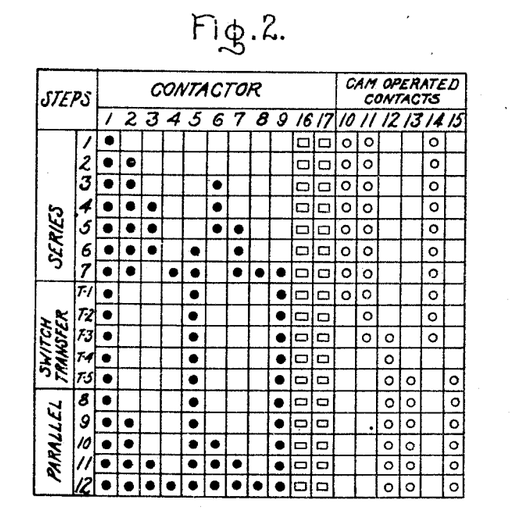
Fig. 2 is a chart indicating the sequence in which the control contactors shown in Fig. 1 are operated in the various steps of series and parallel motoring operation of the locomotive.

The sequence in which the several contactors are operated in the various steps of series and parallel motoring operation of the motors $M_1$, $M_2$, will be apparent from the sequence chart shown in Fig. 2. It will be understood that the interconnection of the respective armature and field windings of the motors $M_1$ and $M_2$ to effect rotation of the motors in either direction is under the control of suitable electrically controlled pneumatically operated reversing switch mechanism which may be of the type illustrated and described in the previous mentioned Patent No. 1,267,817, but which, for the sake of simplicity is not shown in Fig. 1 of the drawings. However, as will more fully appear hereinafter, suitable control apparatus and circuits for the electrically controlled cam-operating mechanism, as well as the electrically controlled reversing switch mechanism of the pneumatically operated type referred to above, are embodied in the schematic control diagram illustrated in Fig. 3.

Figure 3:
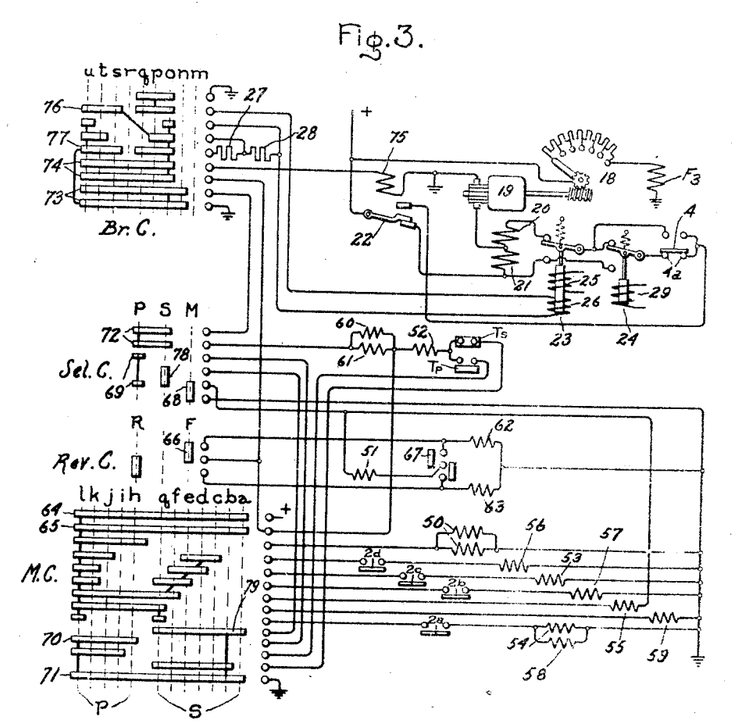
Fig. 3 is a schematic diagram showing the several manually operated controllers and automatic controlling devices, as well as the control circuits whereby the various steps in motoring operation and in regenerative braking operation are effected.

Referring now to Fig. 3, it will be seen that the operation of the several electromagnetic contactors, as well as the cam-operated contactors shown in Fig. 1, is effected under the control of the manually operated master controllers M. C., Rev. C., Sel. C. Br. C., which are employed in the preferred form of locomotive control system illustrated. The main controller M. C. is provided with suitably spaced contact segments for controlling the energizing circuits for the operating windings 50 of the electromagnetic valves of the pneumatic engine controlling the series parallel switch, as well as the operating windings 51 to 61 of the electromagnetic contactors 1 to 9 and 16 and 17 respectively to effect the operation of the several cam-actuated and electromagnetically actuated contactors in the sequence shown in Fig. 2 during motoring operation.

The reversing controller, R. C., is connected to cooperate with the main controller, M. C., to control the energization of the operating windings 62 and 63 which cause the pneumatically operated reversing switch mechanism to operate to the corresponding forward and reverse positions. The selective controller, Sel. C., is arranged to cooperate with the main controller, M. C., in controlling the operating windings 51 and 55 of line contactors 1 and 5 during motoring and regenerative braking operation, and to cooperate with the braking controller, Br. C., to control the energization of the operating windings 60 and 61 of the electromagnetic contactors 16 and 17. The braking controller Br. C. effects the proper energization of the field windings $F_1$, $F_2$ of the motors from the exciters $E_1$, $E_2$ during the regenerative braking operation.

Various mechanical interlocking arrangements are provided between the respective controllers M. C., Sel. C., Rev. C. and Br. C.; thus for instance:

I. The reversing controller cannot be moved from the forward or reverse position unless the main controller is in the off position.

II. The main controller cannot be moved from the off position unless the reversing controller is in the forward or reverse position.

III. The selective controller can be moved from any of its operative positions only when the main controller is in the off, or either of its operative positions $a$ or $(h)$ as indicated in Fig. 3.

IV. The braking controller can be moved from the motoring position $m$ to the equalizing position $n$ only when the main controller is in the operating position $a$ or $(h)$.

V. Movement of the main controller towards the off position from the operating position $(h)$ or from the operating position $b$ causes the braking controller to be returned from the equalizing positions $n$ to the motoring position $m$ indicated in the drawing.

In order to maintain the energization of the field windings $F_1$, $F_2$ of the motors $M_1$, $M_2$ at the proper value for regenerative braking operation, the current in the common shunt field winding $F_3$ of the exciters is controlled by means of the motor operated rheostat 18 diagrammatically illustrated in Fig. 3. As shown, the operating motor 19 of the rheostat is of the series type and is provided with two field windings 20 and 21 which are arranged to operate the motor in opposite directions. The motor 19 is supplied with power from a suitable source indicated as in the drawing through the two position switch 22 which is biased to the position shown and is operated under the joint control of the controllers Br. C., and M. C.

In accordance with my invention, I provide electroresponsive means comprising the current responsive relay 23 and the voltage responsive relay 24 which are connected in circuit with the field windings 20 and 21 as shown in order to selectively control the energization of the field windings 20 and 21 of the motor 19 when the switch 22 is operated, and thereby vary the energization of the exciter shunt field winding $F_3$ so as to automatically vary the current of exciters $E_1$, $E_2$ supplying the energization of the field windings $F_1$, $F_2$ of the traction motors $M_1$, $M_2$ to maintain the regenerated voltage and current within desired limits. Each of the relays 23 and 24 is suitably biased to the position in which it is shown in the drawing as by means of the biasing springs shown.

It will be observed that the current-responsive relay 23 is provided with two windings 25 and 26. As shown in Fig. 1, the operating winding 25 is connected to be energized responsively to the current passing through the exciter $E_1$. The other winding 26 is arranged to be energized from the supply line under the control of the controller Br. C. As will be more fully pointed out hereinafter, the arrangement is such that the winding 26 may be energized so as to act cumulatively or differentially with respect to the winding 25 and the degree of energization of the winding 26 may be varied by inserting the resistors 27 and 28 in circuit therewith. In this way, the value of the exciter current in winding 25 required to operate the relay 23 may be suitably varied in order to vary correspondingly the regenerative braking effect of motors $M_1$ and $M_2$.

The operating winding 29 of relay 24 is connected to the power circuit of the motors through a voltage-reducing resistor 30 as shown in Fig. 1. It will be observed that with the operating winding 29 connected as shown, the relay 24 will be operated responsively to the voltage of motors $M_1$, $M_2$ when the motors are connected in series, as well as in parallel, relation. The relay 29 is designed to maintain the relay contact in its mid position between the stationary contacts cooperating therewith when the voltage of the motors is at a predetermined value and thereby prevent energization of either winding 20 or 21 of motor 19 when the switch 22 is energized. Preferably the predetermined value of the motor voltage is sufficiently above the normal voltage of the trolley T to always insure that regenerative braking action occurs, but still within the safe operating voltage which the motors $M_1$, $M_2$ may safely withstand without arcing or flash-over.

Figure 4:
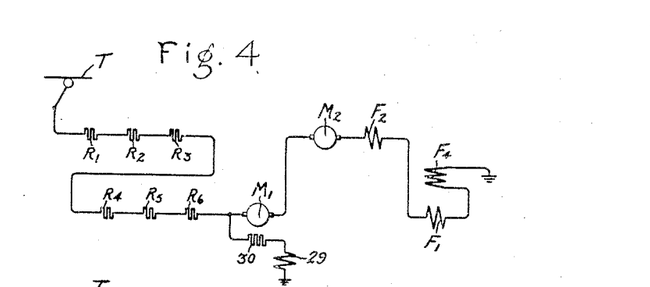
Figs. 4, 5, 6 and 7 illustrate diagrammatically the motor connections obtaining during the initial phases of series and parallel motoring and regenerative braking operation.
Figure 5:
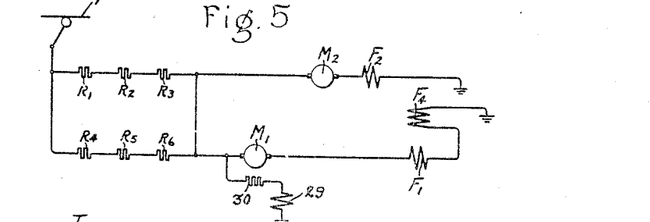

The purpose and function of the several auxiliary interlocking contacts with which certain of the contactors are provided will be more fully understood from the following description of the operation of the locomotive control system embodying my invention, which is as follows:

To accomplish motoring operation with the several elements of the control system in their respective positions in which they are shown in Figs. 1 and 3 of the drawings, the main controller M. C. is operated from the off position in which it is shown to the first operative position, $a$, indicated in the drawing. The reversing controller Rev. C. then is moved to either the position F or R to energize the corresponding operating windings 62 or 63 of the pneumatically operated reversing switch mechanism to interconnect the field windings $F_1$ and $F_2$ with the armature windings of motors $M_1$, $M_2$ to produce rotation thereof in the desired direction. Assuming that the reversing controller Rev. C. is operated to the position F, an energizing circuit for the operating winding 62 is established from the supply source indicated as in the drawing through the control segments 64 and 65 of controller M. C., the segments 66 of controller Rev. C., and thence through the winding 62 to ground. Upon the resulting operation of the reversing switch mechanism to connect the motors $M_1$ and $M_2$ for operation in the forward direction, the right hand auxiliary contact 67 associated therewith is closed. With the controller Sel. C. in position M, this establishes a circuit for the operating winding 51 of electromagnetic contactor 1 which extends through the contact segment 68 of controller Sel. C. to ground in parallel circuit with the winding 62. In this way the motors $M_1$ and $M_2$ are energized through a circuit which may be traced in Fig. 1 from the trolley T through the contactor 1, resistors $R_1$, $R_2$, $R_3$, cam contactor 10, resistors $R_4$, $R_5$, $R_6$, the armature of motor $M_1$, cam contactor 11, the armature of motor $M_2$, the series field winding $F_2$, cam contactor 14, the series field winding $F_1$, and thence through the exciter series field winding $F_4$, to ground. Fig. 4 shows the fundamental connections upon initiating series motoring operation. It will be evident that subsequent operation of the master controller through the successive operative positions b, c, d, e, f, g, serves to establish energizing circuits for the operating windings of the electromagnetic contactors 2, 3, 4, 5, 6, 7, 8 and 9, in the sequence indicated in the first seven steps of series operation indicated in Fig. 2. As indicated in the sequence chart, further operation of the main controller through its operative positions h, i, j, k, l, serves to first energize the operating winding 50 of the electro-magnetic valves controlling the pneumatically operated series-parallel transfer switch mechanism to move the cam operated contacts 10, 11, 12, 13, 14 and 15 from the series to the parallel position and thereby establish the parallel motor connections as shown in Fig. 5 and to successively reenergize the operating windings 52, 56, 53, 57, 54, and 58 of the electromagnetic contactors 2, 3, 4, 6, 7 and 8 in the manner shown in the parallel steps of motoring operation shown in Fig. 2.

During series operation of the motors the operating winding 52 of the resistance controlling contactor 2 is energized through the auxiliary contacts Ts with which the series-parallel transfer switch is provided. After the transfer to parallel connection of the motors is completed, the energizing circuit for winding 52 of the contactor 2 extends through the auxiliary contact Tp which is closed when the series-parallel switch is in its parallel position. This insures that the contactor 2 is open during and until after completion of the transfer from series to parallel connection of the motors. The auxiliary contacts 2a, 2b, 2c and 2d are associated with the resistance controlling contactor 2 and are arranged to be opened and closed simultaneously with the opening and closure of the contactor. Thus when the contactor 2 is opened during transition the other resistance controlling contactors 3, 4, 6, 7, 8 also are opened to insert all of the resistors in the motor circuit during the transfer operation.

Should the operating conditions of the electric locomotive now require that regenerative braking operation of the motors be effected, this may be accomplished with the motors connected either in series or in parallel in the following manner:

Assuming that the main controller is returned to the operating position h in which the parallel connection of the motors is maintained, regenerative braking operation of the motors is effected under these conditions by operating the selective controller Sel. C. to the position P indicated in the drawing and moving the braking controller Br. C. from the motoring position m through the equalizing position n to a selected one of the operative positions o, p, q, r, s, t, u, indicated in the drawing.

Figure 7:
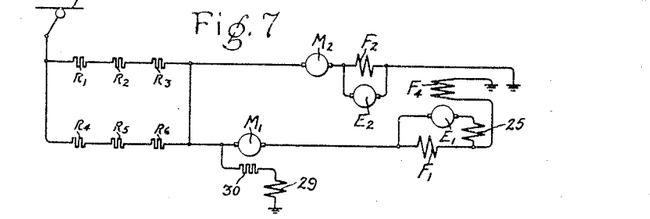

With the selective controller in position P and the main controller in position h the energizing circuit for the electromagnetic line contactors 1 and 5 extends through the segments 69 of controller Sel. C. and the segments 70 and 71 of controller M. C. to ground. The resistance contactors 2, 3, 4 and 6, 7, 8 are deenergized to maintain the corresponding resistances $R_1$, $R_2$, $R_3$, $R_4$, $R_5$, $R_6$ in the motor circuit. Assuming that the position r is selected for the braking controller, an energizing circuit for the operating windings 60 and 61 of the electromagnetic contactors 16 and 17 respectively is established which may be traced from the supply source through the contact segments 64, 65 of controller M. C., the operating windings 60 and 61 in parallel circuit, the contact segments 72 of controller Sel. C., and thence through contact segments 73 of controller Br. C. to ground. The resulting closure of contactors 16 and 17 connects the exciters $E_1$ and $E_2$ respectively across the field windings $F_1$, $F_2$ to supply increased excitation to the motors. The resulting connections obtaining during the initial phases of parallel regenerative braking operation are shown in Fig. 7.

It will be observed that the motor 19 of the motor operated rheostat 18 normally is energized from the supply source through the electromagnetic switch 22 in its lower position, the field winding 21 and armature of motor 19 to ground to effect operation of the rheostat 18 to the position in which the current supplied from the supply source to the exciter shunt field winding $F_3$ is reduced to a minimum value. When the controller Br. C. is moved to the position $r$ to increase the energizing current of the exciter shunt field winding $F_3$ to a value suitable for regenerative braking operation of the locomotive under the particular service conditions obtaining, an energizing circuit for the operating winding of the electromagnetic switch 22 is completed from the supply source through the contact segments 64, 65 of controller M. C., contact segments 74 of controller Br. C. and thence through the operating winding 75 of switch 22 to ground. The resulting operation of switch 22 from the position in which it is shown to its upper circuit closing position places the motor 19 of the motor operated rheostat 18 under the control of the automatic voltage responsive relay 24, having its operating winding 29, as shown in Fig. 1, energized responsively to the regenerated voltage of motors $M_1$ and $M_2$.

Thus, if the voltage of motors $M_1$ and $M_2$ is below the predetermined value at which the voltage responsive relay 29 maintains its contact in the mid position between the stationary contacts cooperating therewith, the movable contact of relay 29 will remain in the biased position in which it is shown in the drawing. Under these conditions, the motor 19 is supplied with power from the supply source through the switch 22 in its upper position, the auxiliary contact $4^a$ which is in the closed position shown when the electromagnetic contactor 4 is open, the contacts of relay 29, the contacts of relay 23, the field winding 20 and the armature windings of the motor 19, to ground. The resulting operation of motor 19 is in the direction required to remove the resistance of rheostat 18 from the energizing circuit of the exciter shunt field winding $F_3$. As the resistance of the rheostat 18 is progressively removed from the exciter shunt field circuit, the excitation of the exciters $E_1$ and $E_2$ is correspondingly increased and the exciters supply a correspondingly increased energizing current to the series field windings $F_1$, $F_2$ of motors $M_1$, $M_2$. The increased excitation of motors $M_1$, $M_2$ increases the regenerated voltage of the motors. When the voltage of the motors $M_1$, $M_2$ is increased to the predetermined value at which relay 29 moves its contacts from the position in which it is shown to the mid position, the power circuit of operating motor 19 is interrupted, and further operation of the rheostat 18 is stopped. If the electric locomotive is operating on a sufficient grade, the speed of rotation of motors $M_1$, $M_2$ may increase and correspondingly increase the regenerated voltage of the motors. In case the regenerated voltage impressed upon the operating winding 29 of relay 24 is sufficient to move the contact of the relay into its lower circuit closing position, a power circuit for the operating motor 19 of rheostat 18 is established through the motor field winding 21. The resulting rotation of motor 19 is in the direction required to re-insert successive steps of the rheostat 18 in circuit with the exciter shunt field winding $F_3$. The decreased excitation of the exciters $E_1$, $E_2$, produces a decreased energization of the series field windings $F_1$, $F_2$ of motors $M_1$, $M_2$ until the regenerated voltage of the motors is decreased to the predetermined value at which the relay 24 maintains its contact in the mid position.

The above described operation has been assumed to take place with the main controller M. C. in the operative position $h$ wherein the resistance controlling contactors 3, 4, 5 and 6, 7, 8 are deenergized and the resistors $R_1$, $R_2$, $R_3$ and $R_4$, $R_5$, $R_6$ are maintained in circuit with the driving motors. Under these conditions the regenerated current of the motors is of limited value. Should it be desired to increase the regenerated current to correspondingly increase the braking effect of the locomotive, the master controller is moved from the position $h$ through the operative positions $i$, $j$, $k$, $l$ to successively energize the resistance controlling contactors 2, 3, 4 and 6, 7, 8 in the sequence indicated for parallel operation in Fig. 2. When the contactor 4 is energized by movement of the main controller to the position 1 and closes to short circuit the resistor $R_1$, the auxiliary contact $4^a$, with which the contactor 4 is provided, is operated out of engagement with its lower stationary contacts and into engagement with the upper stationary contacts indicated in Fig. 3. This removes the control of the motor 19 of the motor operated rheostat 18 from the voltage responsive relay 29 and places the motor operated rheostat under the exclusive control of the relay 23 which has the winding 25 energized responsively to the regenerated current of the motors as has been previously pointed out. So long as the regenerated current of the motor is below a predetermined value the movable contact of relay 23 remains in the position in which it is shown, thus energizing the operating motor 19 through the field winding 20 so as to operate the rheostat 18 in the direction required to increase the excitation of the exciter shunt field winding $F_3$ and correspondingly increase the excitation of the field windings $F_1$, $F_2$ of the motors.

When the regenerated current of the motors increases to the desired value due to the increased excitation of the field windings $F_1$, $F_2$, the winding 25 is energized sufficiently to operate the movable contact of relay 23 from the position in which it is shown to its mid position. This deenergizes the motor 19 and stops further operation of the rheostat 18. Should the speed of the locomotive increase or the line voltage decrease so as to increase the current regenerated by the motors to a value greater than that required to maintain the contacts of relay 23 in its mid position, the movable contact of relay 23 will be operated into engagement with its lower stationary contact to energize the field winding 19 through the field winding 21. The resulting operation of the rheostat 18 will decrease the exciting current of the exciter shunt field winding $F_3$ and correspondingly decrease the excitation of the motor field windings $F_1$, $F_2$, until the decreased regenerated current of the motors permits the relay 23 to return to the mid position. Thus it will be seen that the relay 23 automatically maintains the regenerated current of the motors at a substantially constant value.

Should it be desired to change the value of the regenerated current so as to produce a greater braking effect, the controller Br. C. is moved from the position $r$ to one of the operating positions $s$, $t$, or $u$. In the position $s$ the winding 26 of relay 23 is energized through a circuit extending from the supply source through the segments 64, 65 of the controller M. C., the segments 74 and 76 of controller Br. C., and thence through the winding 26 and the current limiting resistors 27 and 28, the segments 77 and 73 of controller Br. C. to ground. Under these conditions the winding 26 acts differentially to the winding 25 and therefore necessitates a larger value of regenerated current through the winding 25 to maintain the contact of relay 23 in the mid position. As the resistor 27 and then the resistor 28 are successively short circuited by operation of the controller Br. C. to the positions $t$ and $u$ respectively, the value of current in winding 25 required to maintain the relay 23 in the mid position is successively increased.

If, on the other hand, the regenerated current is automatically maintained at too high a value for the desired braking effect, the braking controller may be operated from the position $r$ to one of the operative positions $q$, $p$, or $o$. In this case the winding 26 is energized to act cumulatively with the winding 25 of the relay 23 and the short circuiting of the resistors 27 and 28 serves to successively decrease the value of regenerated current required in winding 25 to maintain the relay 23 in the mid position.

Figure 6:
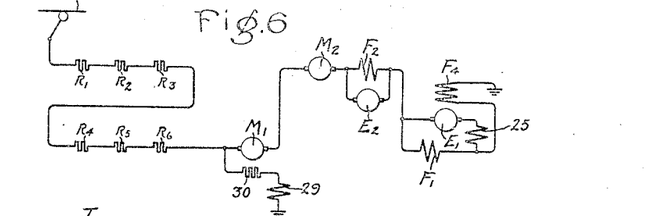

For series regenerative braking the main controller M. C. is moved to its operative positions $a$ and the selective controller is moved to position S. In this case the initial connections for series regenerative braking operation are shown in Fig. 6 and the energizing circuit for the line contactors 1 and 5 extends through the segment 78 of controller Sel. C. and segment 79 of controller M. C. From the description already given it will be apparent that the voltage responsive relay 29 will automatically control the motor operated rheostat 18 to maintain the regenerated voltage of the motors within safe operating limits as long as the contactor 4 is deenergized and the auxiliary contact $4^a$ remains in the position in which it is shown in Fig. 3. After closure of contactor 4 the control of the motor operated rheostat 18 is removed from the voltage responsive relay 24 and the current responsive relay 23 serves to maintain the regenerated current within the predetermined limits in the manner previously described in connection with the parallel regenerative braking operation of the motors.

In the control system illustrated, either parallel or series regenerative braking operation may be initially selected when the locomotive is at rest and obtained upon starting the locomotive after only a transitory period of motoring operation in which all the accelerating resistances $R_1$, $R_2$, $R_3$, $R_4$, $R_5$, $R_6$ are in circuit with the motors. Thus with the locomotive at rest on a steep grade the selective controller C may be operated into position S or P, and the braking controller operated into position $o$. When the main controller M. C. is operated into the corresponding first operating position $a$ or $h$, only a brief period of motoring operation with all of the current limiting resistances in the motor circuit occurs before the voltage responsive relay 29 effects operation of the motor operated rheostat 18 to the position in which the maximum excitation of the motors is obtained. Thus when the train reaches the proper speed the motors at once regenerate and serve to maintain the slack in the train bunched when the air brakes are fully released.

What I claim as new and desire to secure by Letters Patent of the United States, is:—

1. In a motor control system, the combination of an electric motor adapted to operate as a load driven generator, switch mechanism for connecting the motor to a source of supply for motoring operation and for regenerative operation, and automatic electroresponsive means connected to be energized responsively to the voltage of the motor and rendered operative upon establishment of the regenerative braking connections for controlling the motor to maintain the regenerated voltage thereof at a constant predetermined value independent of the supply voltage.

2. In a motor control system, the combination of an electric motor having armature and field windings, switch mechanism for connecting the motor to a source of supply, means for energizing the field winding of the motor to operate the motor as a load driven generator, and electroresponsive means for automatically controlling the said energizing means to maintain the regenerated voltage of the motor at a constant predetermined value independent of the supply voltage.

3. In a motor control system, the combination of an electric motor having armature and series field windings, switch mechanism for connecting the motor to a source of supply for motoring operation thereof, means including an auxiliary source of current for increasing the energization of the series field winding of the motor to operate the motor as a load driven generator, an automatic electroresponsive device connected to be operated responsively to variation of the voltage of the motor from a constant predetermined value, and means whereby said automatic device controls the said auxiliary source of current to reduce the energization of the field winding of the motor when the regenerated voltage of the motor exceeds the said predetermined value.

4. A control system for an electric motor adapted for regenerative braking comprising switch mechanism for connecting the motor to a source of supply for motoring operation and for regenerative braking operation, means for controlling the exchange of current between the motor and the source during regenerative operation, and automatic means for maintaining the regenerative voltage of the motor below a predetermined value when the said current controlling means is operated to maintain the regenerated current of the motor at a relatively low value.

5. A control system for an electric motor adapted to operate as a load driven generator comprising switch mechanism for connecting the motor to a source of supply for motoring operation and for regenerative operation, means for regulating the exchange of current between the motor and the source during both motoring and regenerative operation, means including a second variable resistor for regulating the voltage of the motor during regenerative operation, and an automatic electro-responsive device for controlling said second variable resistor when said first means is operated to maintain the regenerated current of the motor at a relatively low value.

6. A control system for an electric motor having armature and series field windings comprising switch mechanism for connecting the motor to a source of supply for operation in either direction, means for energizing the series field winding of the motor to operate the motor as a load driven generator in either direction, controlling means including a resistor connection in circuit with the motor to regulate the current of the motor during both motoring and regenerative operation, and an electroresponsive device energized responsively to the voltage of the motor and arranged to automatically control said energizing means to maintain the regenerated voltage of the motor below a predetermined value when said resistor is connected in the motor circuit.

7. In a motor control system, the combination of an electric motor having armature and series field windings, switch mechanism for connecting the motor to a source of supply, means for energizing the field winding of the motor to change from motoring operation to operation of the motor as a load driven generator, a resistor for regulating the exchange of current between the motor and the source, a controller for short circuiting the resistor, an electroresponsive device arranged to be operated responsively to variation of the voltage of the motor from a predetermined value, and means controlled by said controller for placing the said energizing means under the control of said electroresponsive device until the said resistor is short circuited.

8. In a motor control system, the combination of an electric motor having armature and series field windings, switch mechanism for connecting the motor to a source of supply, means for energizing the field winding of the motor to operate the motor as a load driven generator, and automatic electroresponsive means energized responsively to the regenerated current and voltage of the motor for controlling the said energizing means to maintain both the regenerated current and voltage of the motor below predetermined values.

9. A control system for an electric motor adapted for regenerative braking comprising switch mechanism for connecting the motor to a source of supply for motoring operation and for regenerative braking operation, and electroresponsive means energized responsively to both the regenerated current and voltage of the motor for controlling the motor to maintain the regenerated voltage thereof at a predetermined value when the regenerated current thereof is below a predetermined value.

10. A control system for an electric motor adapted for regenerative braking comprising switch mechanism for connecting the motor to a source of supply for motoring operation and regenerative braking operation, variable resistance means for regulating the exchange of current between the motor and the source during regenerative braking operation, and an automatic electroresponsive device for controlling the motor to maintain the regenerated voltage at a predetermined value when the said resistance means is operated to maintain the regenerated current of the motor at a relatively low value.

11. In a motor control system, the combination of an electric motor having armature and series field windings, a current limiting resistor for the motor, switch mechanism for connecting the motor in circuit with said resistor to a source of supply for motoring operation, means for energizing the field winding of the motor to operate the motor as a load driven generator, automatic electroresponsive means responsive to a predetermined value of the regenerated current of the motor for controlling said energizing means, a controller for controlling the said resistor to vary the value of the regenerated current of the motor, an electroresponsive device arranged to be operated responsively to variations of the voltage of the motor from a predetermined value, and means jointly controlled by said automatic means and said controller for placing the said energizing means under the control of said electroresponsive device when the regenerated current of the motor is below said predetermined value.

12. A control system for a plurality of electric traction motors comprising switch mechanism for connecting the motors in series and in parallel relation to a source of supply for motoring operation and for regenerative braking operation, variable resistance means for controlling the exchange of current between the motors and the source during both motoring and regenerative braking operation, and automatic electroresponsive means arranged to be energized responsively to the voltage of the motors in both series and parallel relation for controlling the motors to limit the regenerated voltage thereof to a predetermined value when the said resistance means is operated to maintain the regenerated current of the motors at a relatively low value.

13. A control system for a plurality of electric traction motors, each having armature and series field windings, comprising switch mechanism for connecting the motors in series and in parallel relation to a source of supply, means for energizing the series field windings of the motors to operate the motors as load driven generators in both series and parallel relation, variable resistance means for controlling the exchange of current between the motors and the source during both motoring and regenerative braking operation, automatic electroresponsive means operable responsively to a relatively high value of the regenerated current of the motors for controlling the said energizing means to limit the regenerated current of the motors to a predetermined value, an electroresponsive device arranged to be operated responsively to variations of the voltage of the motors from a predetermined value in both series and parallel relation, and connections jointly controlled by said variable resistor means and said automatic current responsive means for placing the said energizing means under the control of said electroresponsive device when said resistance means is operated to maintain the regenerated current of the motor at a relatively low value.

In witness whereof, I have hereunto set my hand this 15th day of May 1925.

WILLIAM S. H. HAMILTON.